(12) United States Patent
Graca et al.

(10) Patent No.: US 9,417,625 B2
(45) Date of Patent: Aug. 16, 2016

(54) ROBOT SYSTEM CALIBRATION METHOD

(71) Applicant: Fanuc America Corporation, Rochester Hills, MI (US)

(72) Inventors: Randy A. Graca, Macomb, MI (US); Thomas R. Galloway, Commerce Township, MI (US); Nivedhitha Giri, Auburn Hills, MI (US); Gordon Geheb, Hartland, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 143 days.

(21) Appl. No.: 14/089,911

(22) Filed: Nov. 26, 2013

(65) Prior Publication Data

US 2014/0148949 A1 May 29, 2014

Related U.S. Application Data

(60) Provisional application No. 61/731,137, filed on Nov. 29, 2012.

(51) Int. Cl.
*B25J 9/16* (2006.01)
*G05B 19/418* (2006.01)

(52) U.S. Cl.
CPC ......... *G05B 19/41815* (2013.01); *B25J 9/1671* (2013.01); *B25J 9/1682* (2013.01); *B25J 9/1692* (2013.01); *G05B 2219/32351* (2013.01); *G05B 2219/32385* (2013.01); *G05B 2219/39013* (2013.01); *G05B 2219/39014* (2013.01); *G05B 2219/39021* (2013.01); *G05B 2219/39102* (2013.01); *G05B 2219/39135* (2013.01); *Y02P 90/26* (2015.11)

(58) Field of Classification Search
CPC .......... B25J 9/00; B25J 9/1692; B25J 9/1682; B25J 9/1671; G05B 19/00; G05B 19/401; G05B 16/4015; G05B 19/41815; G05B 2219/32351; G05B 2219/39135; G05B 2219/39013; G05B 2219/39014; G05B 2219/39021; G05B 2219/39102; G05B 2219/32385
USPC ......... 700/245, 248, 250, 251, 253, 254, 257; 703/7
See application file for complete search history.

(56) References Cited

U.S. PATENT DOCUMENTS

| | | | | |
|---|---|---|---|---|
| 5,297,238 A | * | 3/1994 | Wang | B25J 9/1692 700/254 |
| 6,321,137 B1 | * | 11/2001 | De Smet | B25J 9/1692 700/245 |
| 2005/0273198 A1 | * | 12/2005 | Bischoff | B25J 9/1682 700/248 |
| 2006/0023938 A1 | * | 2/2006 | Ban | G01B 21/042 382/153 |
| 2006/0212170 A1 | * | 9/2006 | Nagatsuka | B23K 26/0884 700/245 |
| 2008/0301072 A1 | * | 12/2008 | Nagatsuka | B25J 9/1669 706/12 |
| 2010/0262288 A1 | * | 10/2010 | Svensson | B25J 9/1671 700/254 |
| 2012/0269387 A1 | * | 10/2012 | Becker | G06T 7/2053 382/103 |

* cited by examiner

*Primary Examiner* — Stephen Holwerda
(74) *Attorney, Agent, or Firm* — Fraser Clemens Martin & Miller LLC; William J. Clemens

(57) ABSTRACT

A system for calibrating a multi-robot system includes a robot simulation device having a processor disposed therein for creating a simulation work cell of an operation of a real robot work cell, the robot simulation device configured to communicate with a robot control system controlling the robots of the real robot work cell. The simulation work cell is created based upon a predetermined layout of the real robot work cell. The system further includes a software program executed by at least one of the robot simulation device and the robot control system for calculating a part tracking offset between the simulation work cell and the real robot work cell for controlling the robots.

19 Claims, 6 Drawing Sheets

ROBOT SYSTEM CALIBRATION METHOD

This application claims priority to U.S. Provisional Patent Application Ser. No. 61/731,137 filed Nov. 29, 2012, hereby incorporated herein by reference in its entirety.

FIELD OF THE INVENTION

This invention relates to a method of calibrating a multi-robot system in a production facility.

BACKGROUND OF THE INVENTION

Currently, graphical offline programming solutions simplify robotic path teach and paint process development. The solutions are specifically designed to create robotic paths that can be utilized by robot controller application software. These solutions include calibration features in which offset data is calculated and a method is provided to the user to manually shift or offset the taught paths.

In current implementations of robots utilized for painting processes, tracking frames and user-defined frames are generally available to globally shift taught points at run time. However, these frames must generally be calculated and set manually by the user. In non-painting systems, vision is sometimes used to assist the user in this activity.

Additionally, offline simulation solutions may have calibration utilities to calculate the offset data based on teaching and touching up points on a simulated CAD model of the part to be painted. However, the existing calibration utilities only provide the user with offset data to manually apply to the taught paths of the robot. Furthermore, the offset data provided by existing calibration utilities may not be expressed in the proper frame.

Finally, calibration utilities are known in the art to calculate stationary frames in robot work cells used in a production setting. However, these calibration utilities are only capable of calculating frames for fixed work pieces in fixed work areas and do not take into account a work piece on a moving conveyor. The current calibration utilities also require special tooling or hardware to perform the calibration.

The prior art has been inadequate in a number of ways. First, the calibration utilities known are vastly limited because at least some amount of manual calculation on the part of the user is required. Second, in a painting operation, methods of incorporating vision to assist a user with the known calibration are not always feasible due to the hazardous paint environment and a limited camera field of view. Third, because the current calibration utilities require special hardware, the overall calibration utility can become quite costly. Fourth, existing calibration techniques that do calculate frames and offsets do not properly account for a work piece on a moving conveyor. It would be advantageous if systems and methods of calibrating a robot could be improved.

SUMMARY OF THE INVENTION

In accordance with the instant disclosure, an improved system and method of calibrating a multi-robot system has surprisingly been discovered.

According to an embodiment of the invention a system for calibrating a multi-robot system is disclosed. The system includes a robot simulation device having a processor disposed therein and configured for creating a simulation work cell of an operation of a real robot work cell, the robot simulation device configured to communicate with a real robot control system; and a software program executed by at least one of the robot simulation device and the real robot control system for calculating a part tracking offset between the simulation work cell and the real robot work cell.

According to another embodiment, a method for calibrating a multi-robot system comprises the steps of: creating a simulation work cell of an operation of a real robot work cell through a robot simulation device, the simulation work cell is based on a predetermined layout of the real robot work cell; establishing tracking frames in the simulation work cell through the robot simulation device; determining, through a real robot control system, if a deviation exists between the simulation work cell and the real robot work cell; and executing at least one of a frame calibration and a calibration path through the real robot control system to calibrate the simulation work cell with the real robot work cell.

According to yet another embodiment, a method for calibrating a multi-robot system comprises the steps of: creating a simulation work cell of an operation of a real robot work cell through a robot simulation device, the simulation work cell is based on a predetermined layout of the real robot work cell; establishing tracking frames in the simulation work cell through the robot simulation device; determining, through a real robot control system, if a deviation exists between the simulation work cell and the real robot work cell; executing at least one of a frame calibration and a calibration path through the real robot control system to calibrate the simulation work cell with the real robot work cell; relocating, through the robot simulation device, the simulation work cell to be substantially equivalent to the real robot work cell; and calculating a part tracking offset through the robot simulation device based on the relocation of the simulation work cell.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
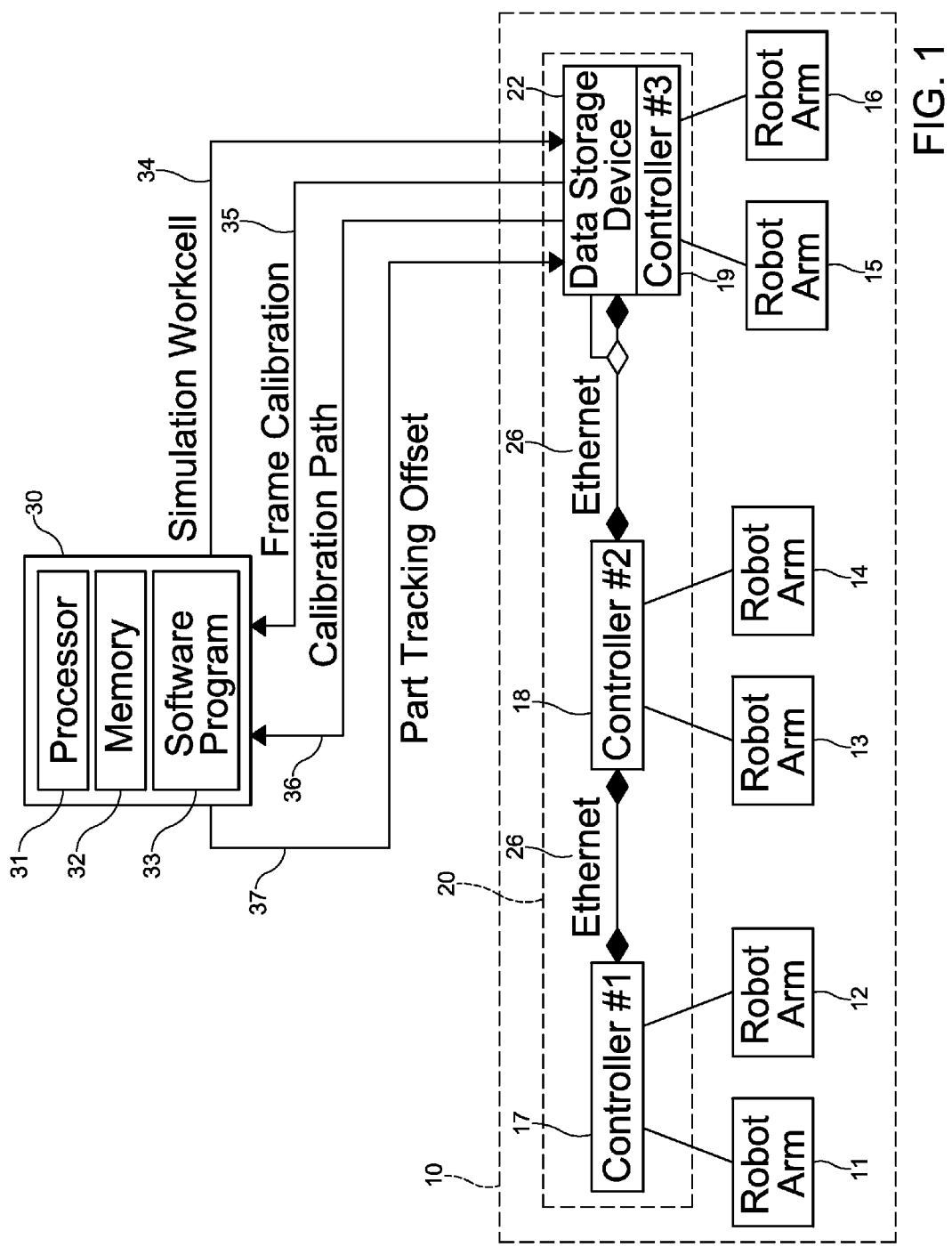
FIG. 1 is a schematic block diagram of a system for performing the method according to an embodiment of the invention.

FIG. 1 is a schematic block diagram of a system for performing the method according to an embodiment of the invention. A real robot work cell 10 facilitates enabling a robotic manufacturing process to be carried out. In the embodiment illustrated in FIG. 1, the real robot work cell 10 is schematically representative of a paint booth work cell. However, the real robot work cell 10 can be a work cell for any manufacturing process, as desired. The real robot work cell 10 can include a plurality of robots 11, 12, 13, 14, 15, 16 controlled and monitored by a robot control system 20. The robots 11, 12, 13, 14, 15, 16 can be painting robots, vehicle door opening robots, vehicle hood opener robots, vehicle trunk opening robots, or any other robot used to perform any other application as desired. Additionally, while six robots 11, 12, 13, 14, 15, 16 are illustrated in FIG. 1, any number of robots can be included in the real robot work cell 10 such as any number of robots less than or more than six robots.

With continuing reference to FIG. 1, two of the robots 11, 12 are connected to a controller #1 17 of the robot control system 20. Two of the robots 13, 14 are connected to a controller #2 18 of the robot control system 20. Two of the robots 15, 16 are connected to a controller #3 19 of the robot control system 20. It is understood, any number of robots can be connected to each of the controllers, as desired, for coordinating operation of one or more robots. Additionally, any number of controllers can be used, as desired, for coordinating operation of one or more robots. The controllers 17, 18, 19 may communicate directly or indirectly through a communication protocol for coordinated operation of the robots 11, 12, 13, 14, 15, 16 to perform a selected process, such as a painting process, for example. The controllers 17, 18, 19 can communicate wired or wirelessly through any network as desired. For example, as shown in FIG. 1, the controllers 17, 18, 19 can communicate via an Ethernet network 26.

The robot control system 20 includes a data storage device 22 for obtaining data and storing data communicated from the controllers 17, 18, 19. The data storage device 22 can also be included with any of the controllers 17, 18, 19. The data storage device 22 is capable of being connected to the real robot work cell 10 and to a robot simulation device 30 positioned external to the real robot work cell 10. The robot simulation device 30 is a device used to simulate operation of the robots 11, 12, 13, 14, 15, 16 and facilitate obtaining optimum placement and movement of the robots 11, 12, 13, 14, 15, 16. The robot simulation device 30 has a processor 31 and a memory 32. Although not shown in FIG. 1, the robot simulation device 30 can also include user input devices for inputting data for user editing, correcting, instructing, etc. and a display for showing, at the same time, three-dimensional simulations of the robots 11, 12, 13, 14, 15, 16, a work piece 50 (FIG. 3), or any other device within the real robot work cell 10, as desired.

The processor 31, is instructed by a software program 33 stored on the robot simulation device 30 to create an offline construction of a simulation work cell as data 34 which is communicated with the controllers 17, 18, 19 of the robot control system 20. The software program 33 can be any software program configured for simulating a three dimensional robotic work cell, or any other software program that is compatible with CAD and can simulate operation of a multi-robot work cell. Other data can be transferred between the robot simulation device 30 and the data storage device 22 of the robot control system 20. The data can include a frame calibration data 35, a calibration path data 36, or any other data as desired to facilitate creating paths for and calibrating multi-robot systems. Furthermore, the software program 33 can calculate a part tracking offset data 37 which can then be downloaded to the data storage device 22 for use by the controllers 17, 18, 19.

Figure 2:
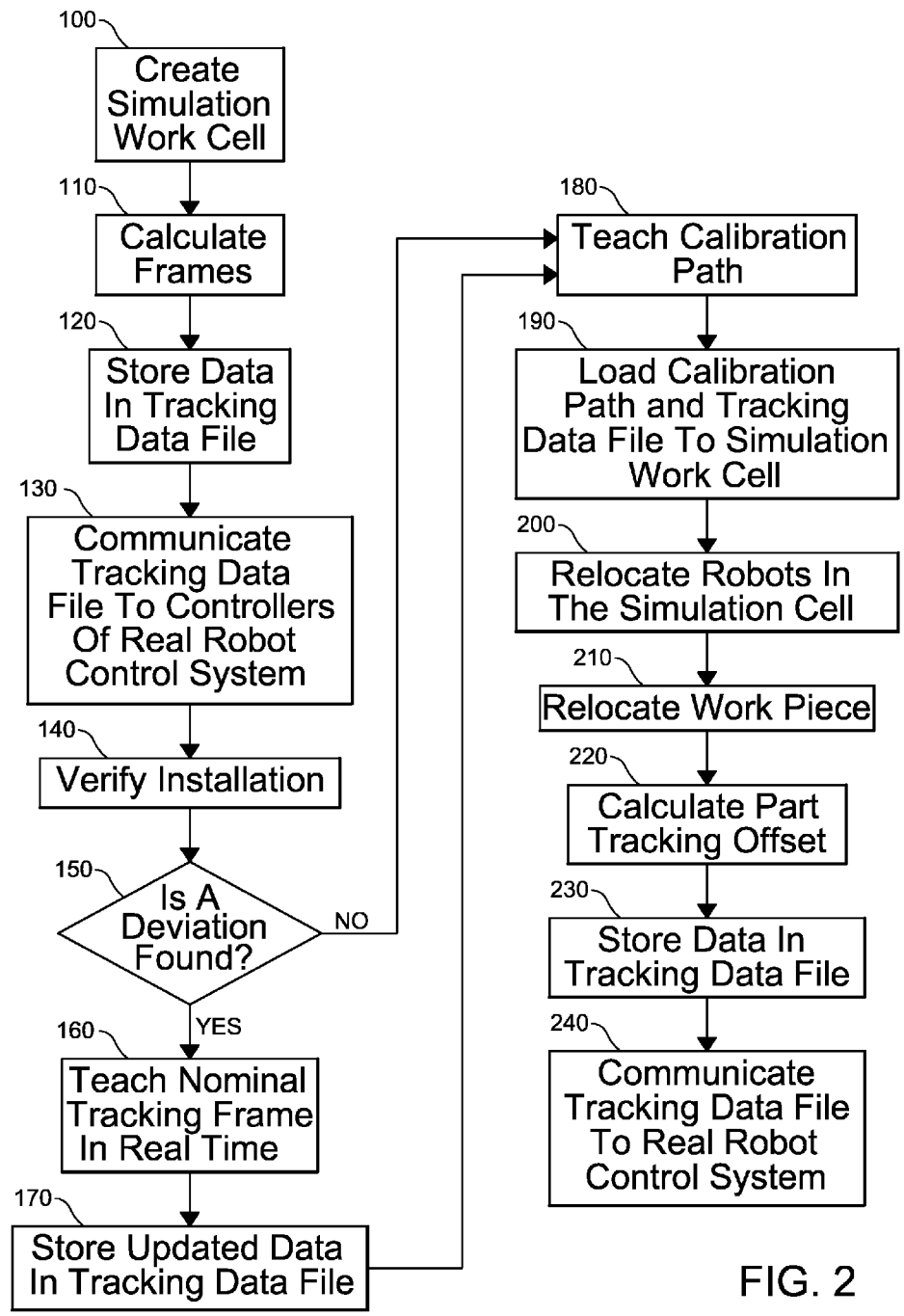
FIG. 2 is a flow diagram of a method for calibrating a multi-robot system according to the invention.

As shown in FIG. 2, a method for calibrating a multi-robot system is provided. In a step 100, the simulation work cell 34 is created offline separate from the robot control system 20 of the real robot cell frame 10 which operates in real time. The simulation work cell 34 is a predetermined simulated layout of any devices in the real robot work cell 10 based on manufacturing installation drawings and plans that are imported from CAD models to the robot simulation device 30. This predetermined simulated layout represents an "ideal" installation or layout based on installation drawings before deviations may occur during actual installation of all the devices in the real robot work cell 10 at a robotic manufacturing process site. The simulation work cell 34 can be constructed at any time as desired such as prior, during, or after installation of the real robot work cell 10 at a robotic manufacturing process site.

Figure 3:
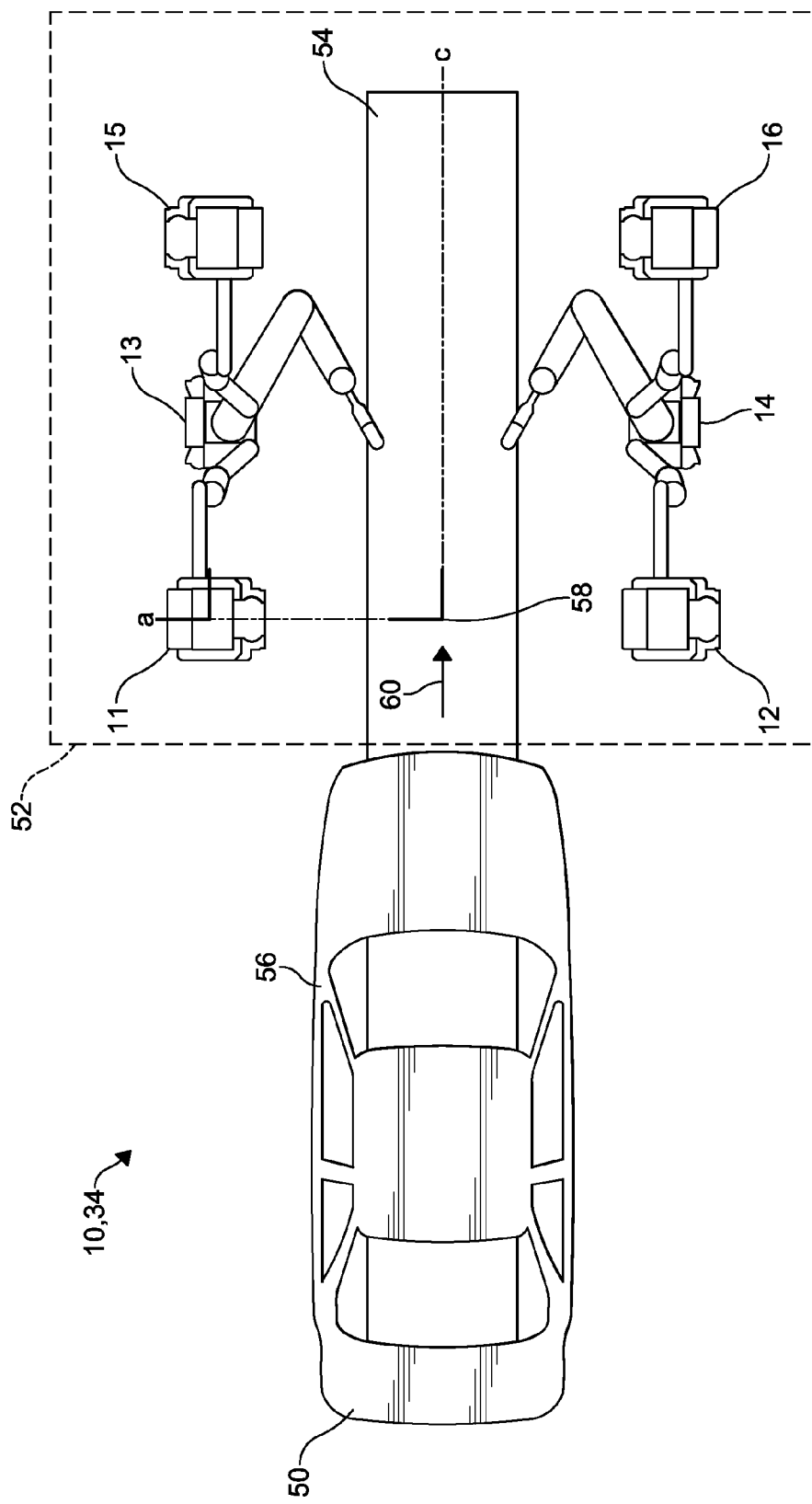
FIG. 3 is a schematic plan view diagram of defining tracking frames according to an embodiment of the invention.

FIG. 3 is a schematic plan view diagram of calculating tracking frames, step 110, according to an embodiment of the invention. The illustration is representative of how both the real robot work cell 10 and the simulation work cell 34 should look in real time according to the predetermined layout. This simulation work cell 34 is an example of what may be displayed on the robot simulation device 30. The exemplary simulation work cell 34 illustrates the work piece 50 disposed on a conveyor 54 and the robots 11, 12, 13, 14, 15, 16 that operate within an operation zone 52. The work piece 50 illustrated is a vehicle body, specifically a car body, according to one style or model of vehicle bodies. The work piece 50 can be interchanged to be any type of vehicle body according to any style or model of vehicles. The robots 11, 12, 13, 14, 15, 16 can be programmed to perform the desired operation on the work piece 50, as desired.

In the step 110, once the simulation work cell 34 has been constructed, tracking frames are established offline through the robot simulation device 30 such as a nominal tracking frame for each of the robots 11, 12, 13, 14, 15, 16 and a work cell frame. The offline simulation device 30 can establish any location on the simulation work cell 34, as desired, to correspond to the work cell frame. In a non-limiting example, as illustrated in FIG. 3, a work cell frame can be established on the simulation work cell 34 as being at a specified position 56 of the work piece 50 as it is travels on the conveyor 54. The position 56 can be established when the work piece 50 reaches a part detect switch (not shown) before entering the operation zone 52. The part detect switch signals the position of the work piece 50 so that the controllers 17, 18, 19 begin controlling the robots 11, 12, 13, 14, 15, 16 to perform the process.

In a step 120, the simulation work cell 34 data that is generated offline during the calculation of the tracking frames in step 110 is stored in a data tracking file stored on the robot simulation device 30. In a step 130, the data tracking file with the simulation work cell 34 data is transferred or downloaded to the data storage device 22 of the robot control system 20 to be communicated to the controllers 17, 18, 19 of the robots 11, 12, 13, 14, 15, 16. The file can be in any file format configured to be compatible for reading and writing by both the robot simulation device 30 and the controllers 17, 18, 19, such as an XML data file, for example.

In a step 140, installation data is verified in the robot control system 20. In a step 150, the actual installation of the robot work cell 10 is compared to the simulation work cell 34 that was established based on the "ideal" installation to determine if there is a deviation between the robot work cell 10 and the simulation work cell 34. If the simulation work cell 34 configuration is not sufficiently close to the real robot work cell 10 configuration, the frame calibration 35 procedure is performed in steps 160 and 170. If the actual installation of the robot work cell 10 is sufficiently close to the "ideal" installation, then the calibration path 36 can be taught, as shown in a step 180.

In the step 160, nominal tracking frames for each robot 11, 12, 13, 14, 15, 16 are taught by a user in real time in the real robot work cell 10 through the robot control system 20. The nominal tracking frames for each robot 11, 12, 13, 14, 15, 16 are taught by a user through a robot teach program. The teach program includes an offset calculation. Through the robot control system 20, a method is executed to determine a work cell frame of the real robot work cell 10. The work cell frame is any position in the real robot work cell 10 where the same nominal tracking frame for each robot 11, 12, 13, 14, 15, 16 is established. This same location becomes, in the robot control system 20, the work cell frame location for the purpose of establishing a common work cell frame across all the robot controllers 17, 18, 19. In order to attain a result in which the nominal tracking frame for each robot 11, 12, 13, 14, 15, 16 is the same position, any procedure can be used as desired. The actual position of where the work cell frame is established is not critical and can be chosen as desired. In a non-limiting example, as shown in FIG. 3, the work cell frame can be chosen to be at a conventional location 58 where a longitudinal centerline c of the conveyor 54 intersects with an axis a of the world frame origin of the first upstream robot 11 with respect to a travel direction 60 of the work piece 50 on the conveyor 54. Therefore, the nominal tracking frame for each robot 11, 12, 13, 14, 15, 16 can be taught to be at the conventional location 58 of the work cell frame. It is understood that any position can be chosen as desired to be the work cell frame.

Figure 4:
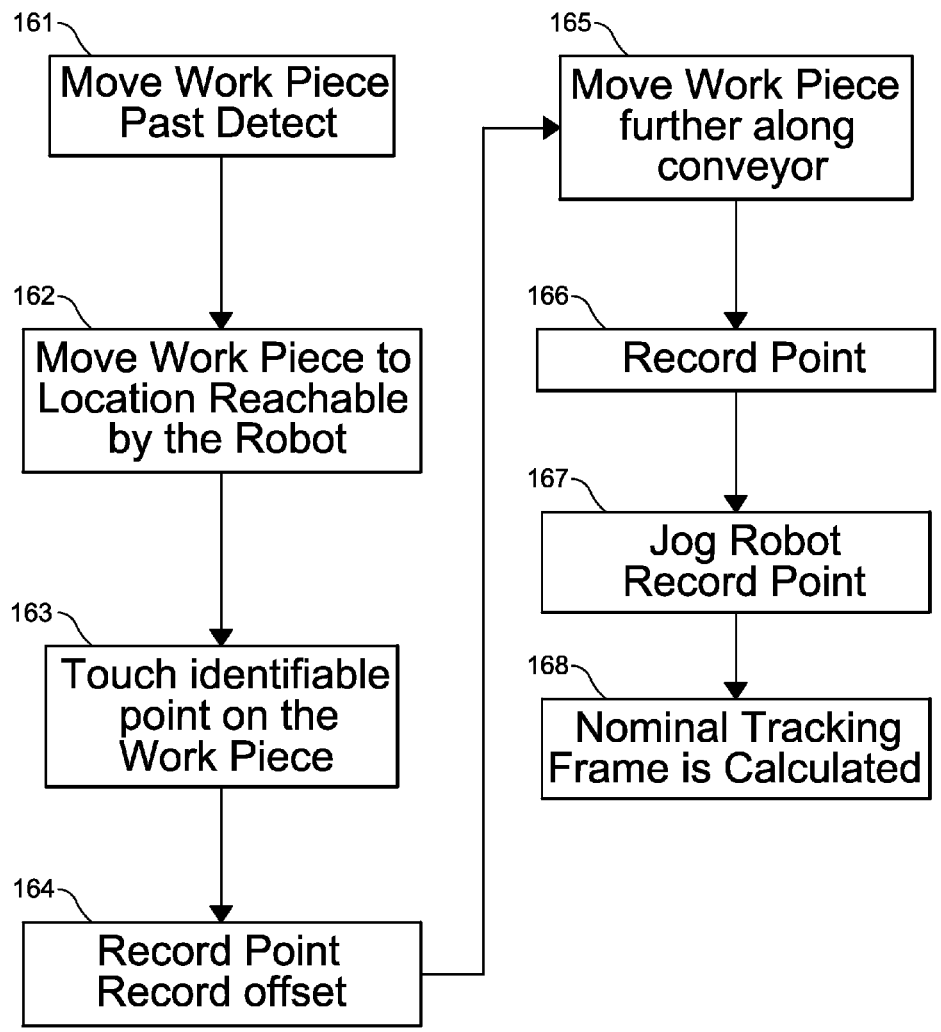
FIG. 4 is a flow diagram of a method for teaching nominal tracking frames according to an embodiment of the invention.
Figure 5:
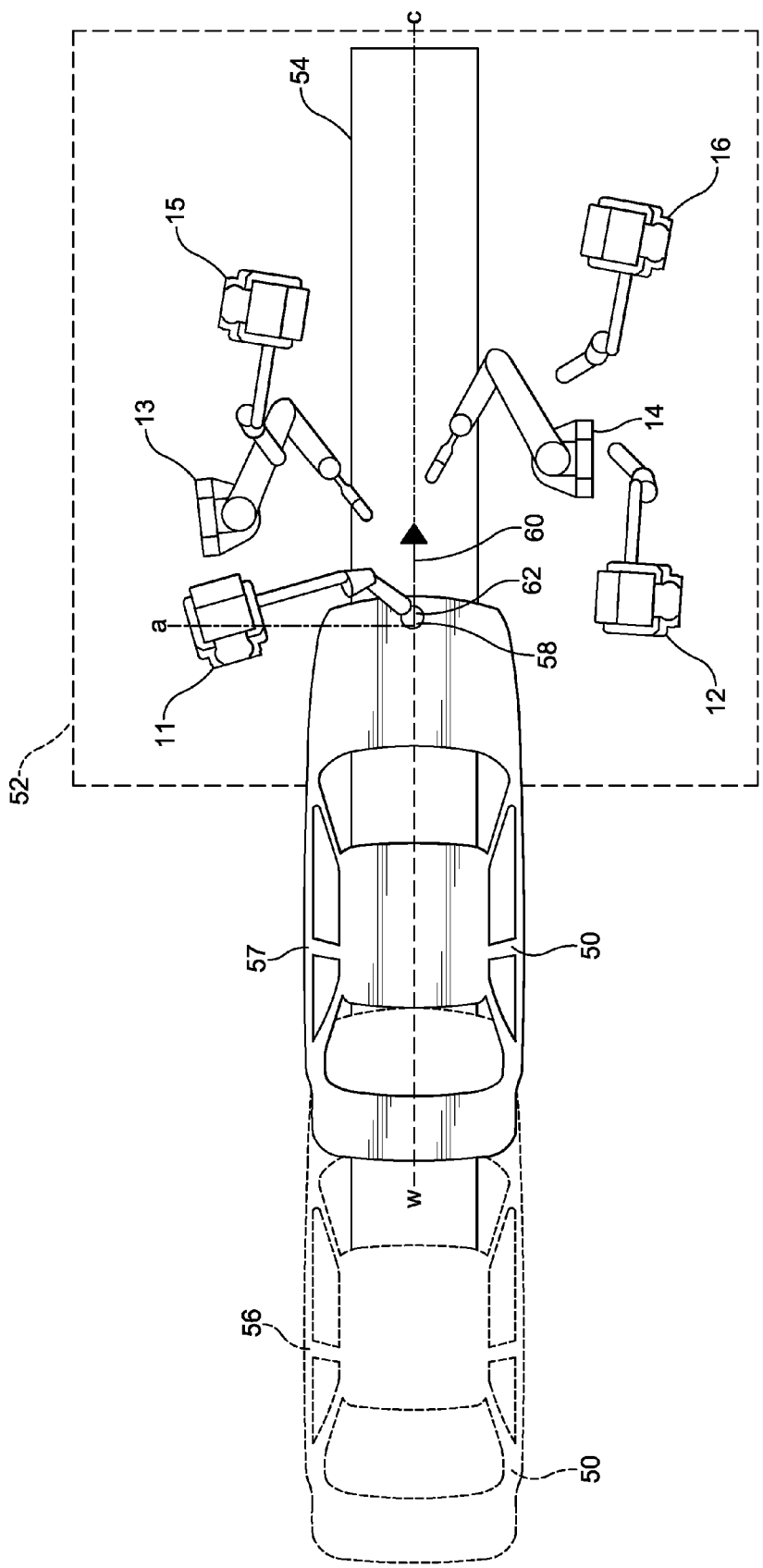
FIG. 5 is an exemplary schematic plan view diagram of teaching the nominal tracking frame according to the method of FIG. 4.

As shown in FIGS. 4 and 5, a method of teaching the nominal tracking frame of the step 160 is illustrated according to an embodiment of the invention. As illustrated, the real robot work cell 10 is deviated from the "ideal" robot layout. This method is performed for each robot 11, 12, 13, 14, 15, 16 in the real robot work cell 10. In a first step 161, the work piece 50 is moved past the part detect switch into the operation zone 52 for teaching. The step 161 is performed so that the distance along the conveyor from each taught point for the nominal tracking frame to the part detect switch location will be known. FIG. 5 illustrates an exemplary schematic plan view of the method for teaching the nominal tracking when choosing the conventional location 58 as the work cell frame. As illustrated, the work piece 50 is moved from the specified position 56 at the part detect switch to a specified position 57 reachable by the first upstream robot 11, as shown in step 162. A tool of the first upstream robot 11 touches an identifiable point 62 on the work piece 50 in a step 163. In a non-limiting example, the identifiable point 62 is illustrated as a point on the work piece 50 located at a longitudinal centerline w of the work piece 50. However, the identifiable point 62 can be located anywhere on the work piece 50 as desired.

With continuing reference to FIGS. 4 and 5, in a step 164, a first position of the identifiable point 62 is recorded as the origin point in the robot control system 20. In the non-limiting example illustrated in FIG. 4, the recording of the identifiable point 62 at the first position can be when the identifiable point 62 is aligned with the conventional location 58 defined as the work cell frame. The offset, or the distance of the work piece 50 from the part detect switch, is also recorded in the step 164. The identifiable point 62 can be recorded at any position in the work cell 10 as desired. In a step 165, the work piece 50 is then moved further downstream on the conveyor 54 in respect of the direction of travel 60 of the conveyor. In the step 165, the identifiable point 62 is touched again at a second position. The second position is then recorded as the conveyor point in a step 166. In a step 167, the tool of the robot 11 is jogged to a third position that is in a direction perpendicular or normal to the travel direction 60 of the conveyor 54. The work piece 50 does not have to be moved along the conveyor during the step 167. The third position is recorded as the normal point, in the step 166. In a step 168, the resulting nominal tracking frame is calculated. This procedure can be repeated for each of the robots 11, 12, 13, 14, 15, 16.

According to an embodiment of the invention, the nominal tracking frame can be expressed as follows:

$$T_{final} = T_{initial} * P$$

where $T_{final}$ is the resulting nominal tracking frame calculated in the step 168. $T_{initial}$ is the nominal tracking frame that is calculated according to existing teach programs which is represented by a 4×4 transformation matrix. The x-direction of $T_{initial}$ can be defined by the vector $(P_c - P_O)$, where $P_O$ is the origin point and $P_c$ is the conveyor point. The z-direction is determined by the vector cross product $[(P_c - P_O) \times (P_N - P_C)]$ where $P_N$ is the normal point. Given the x-direction and the z-direction, the y-direction can be automatically defined as orthogonal to the x-direction vector and the z-direction vector according to the right hand rule. P is the offset that is recorded in the step 164. The offset is represented by a 4×4 transformation matrix with a value only in the x-coordinate such that P=[xyzw pr]=[(offset value) 0 0 0 0], where the offset value is the distance of the work piece 50 from the part detect switch. By determining the offset from the part detect switch and using the offset in the calculation of the nominal tracking frame, a nominal tracking frame common to all robots 11, 12, 13, 14, 15, 16 in the real robot work cell 10 is ensured. This common nominal tracking frame becomes the work cell frame.

As shown in FIG. 2, in the step 170, the frame calibration 35 is stored in the data tracking file. In certain multi-robot systems, it may be the case that not all of the robots in the multi-robot system will be able to touch the identifiable point 62 on the work piece 50. In this scenario, the work cell frame can be determined by a robot-to-robot calibration technique such that the work cell frame can be copied from a robot that has already established the work cell frame to the other robots in the multi-robot system. Additionally, it is understood that other methods may be employed to teach nominal tracking frames as desired such as using vision to teach the nominal tracking frames to establish the work cell frame.

With continuing reference to FIG. 2, the calibration path 36 is taught on the work piece 50 according to an embodiment of the invention in the step 180. If the simulation work cell 34 is sufficiently close to the "ideal" robot layout, the calibration path 36 can be taught or the calibration path 36 can be taught after the frame calibration 35 is determined. The calibration path 36 is taught for each style of the work piece 50. The calibration path 36 is taught through a teach program on one of the robots 11, 12, 13, 14, 15, 16. The calibration path 36 can be taught on one of the robots 11, 12, 13, 14, 15, 16 in the real robot work cell 10 by teaching at least three non-linear points on the work piece 50. The three non-linear points can be points on the work piece 50 that correspond with identifiable features on the work piece 50 itself that can be seen visually on the work piece 50 and on the CAD displayed on the robot simulation device 30. The calibration path 36 only needs to be taught on one robot 11, 12, 13, 14, 15, 16. In a non-limiting example, the calibration path 36 can be taught on the first upstream robot 11 in respect of the direction of travel 60 of the conveyor 54. In a step 190, the calibration path 36 and the data tracking file with the frame calibration 35 are loaded back to the robot simulation device 30.

Figure 6:
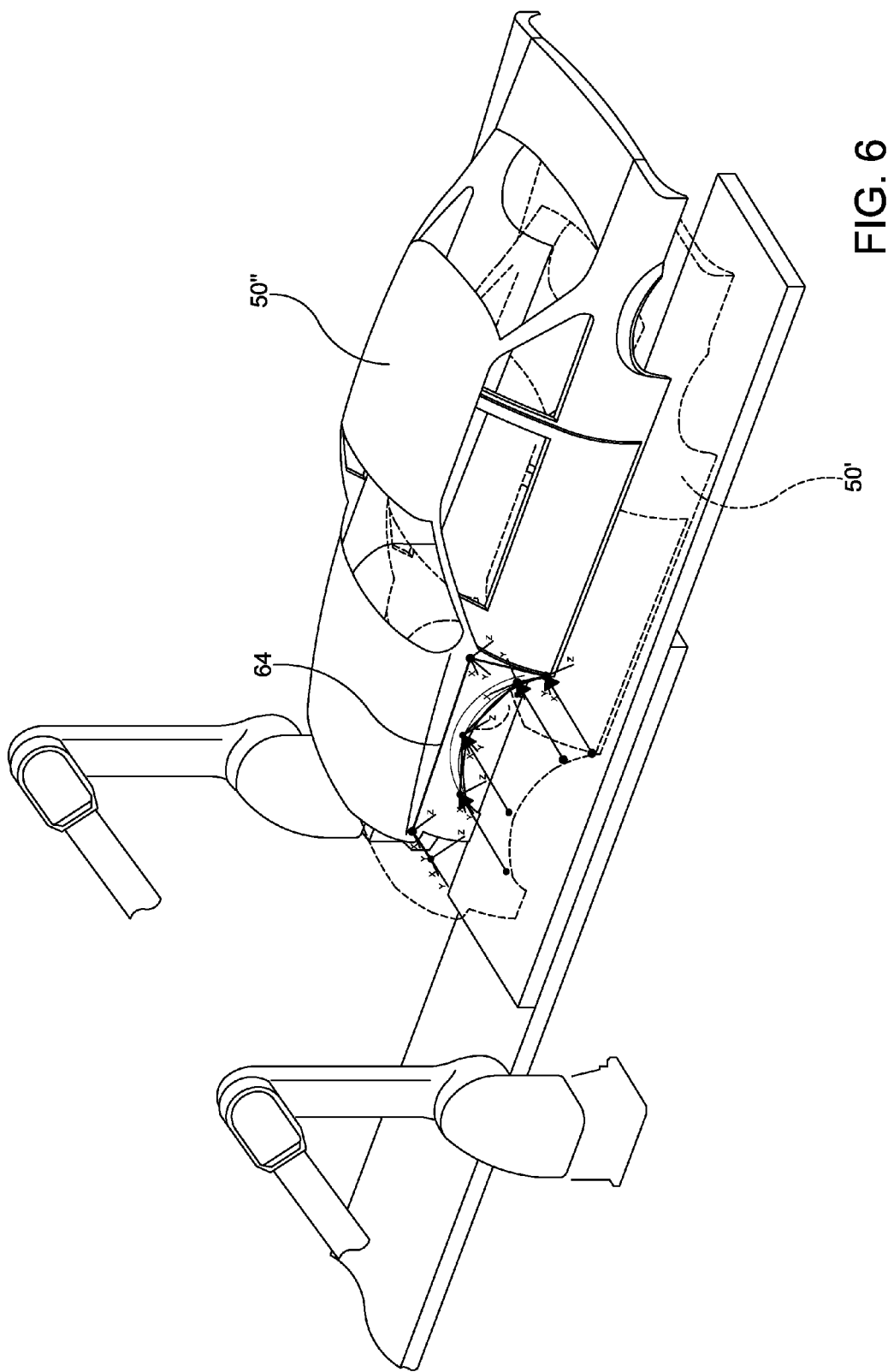
FIG. 6 is an exemplary perspective view of a simulation work cell used to calculate a part tracking offset according to embodiment of the invention.

In a step 200, the robots 11, 12, 13, 14, 15, 16 are relocated or realigned through the simulation work cell 34 of the robot simulation device 30 based on the frame calibration 35. After the robots 11, 12, 13, 14, 15, 16 are relocated, the work piece 50 as displayed on the simulation work cell 34 through the CAD on the robot simulation device 30 is then relocated based on the calibration path 36 in a step 210. FIG. 6 illustrates an example of the CAD display of the simulation work cell 34 on the robot simulation device 30 after the calibration path 36 is loaded to the robot simulation device 30. The illustration shows the work piece 50' according to the "ideal" layout and a representation of the work piece 50" in the real robot work cell 10 according to the calibration path 36. A node map 64 representing the calibration path 36 taught on the work piece 50" in the real robot work cell 10 is displayed. The node map 64 is displayed so a user, through the robot simulation device 30, can physically align the work piece 50' according to the "ideal" layout with the work piece 50" in the real robot work cell 10. To align, the work piece 50' of the "ideal" layout is lined up with the node map 64 displayed on the robot simulation device 30. This step 210 is performed for each style of the work piece 50.

In a step 220, the robot simulation device 30 calculates the part tracking offset 37. The part tracking offset 37 is a variable 4×4 transformation that corresponds to the change in the position of work piece 50' of the "ideal" layout from the position of the work piece 50" in the real robot work cell 10. The 4×4 transformation is expressed as the nominal tracking frame for each robot 11, 12, 13, 14, 15, 16. Since the nominal tracking frame for each robot is at the same location, or at the work cell frame, then the part tracking offset 37 only needs to be calculated for one robot 11, 12, 13, 14, 15, 16. The resulting data from the calculation of the part tracking offset 37 can then be valid for all robots on the same side of the conveyor. For example, the part tracking offset 37 can be calculated for the first upsteam robot 11 and that calculation will be valid for the robots 13, 15 on the same side of the conveyor 54. This part tracking offset 37 can then be used for the robots 12, 14, 16 that may be on the other side of the conveyor, for example, by using a simple sign change in directional and rotational components, of the nominal tracking frames of the robots 12, 14, 16 as needed.

Once the part tracking offset 37 is calculated, the part tracking offset 37 is stored in the tracking data file as illustrated in a step 230. The tracking data file with the part tracking offset 37 is then uploaded to the robot control system 20 in a step 240 to be used by the robot controllers 17, 18, 19 through the data storage device 22. On the robot control system 20, the part tracking offset 37 for each style of the work piece 50 is used during production and teaching of the real multi-robot system. This part tracking offset 37 can be used to shift production positional data when the work piece 50 is being processed or produced.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for calibrating a multi-robot system comprising:

a robot simulation device having a processor disposed therein for creating a simulation work cell based upon a predetermined layout of a real robot work cell, the robot simulation device communicating with a robot control system controlling robots in the real robot work cell;

a software program executed by at least one of the robot simulation device and the robot control system for calculating a part tracking offset between the simulation work cell and the real robot work cell, the robot control system using the part tracking offset to control the robots; and the robot simulation device calculating the part tracking offset in response to a tool of the real robot work cell contacting an identifiable point on a work piece at a first position of the work piece in the real robot work cell, contacting the identifiable point on the work piece at a second position of the work piece in the real robot work cell, and jogging of the tool to a third position in a direction perpendicular to a travel direction of the work piece through the real robot work cell.

2. The system according to claim 1, wherein the robot simulation device operates offline from the robot control system.

3. The system according to claim 1, wherein the robot simulation device has a display providing a three-dimensional model of the multi-robot system and a work piece in the real robot work cell.

4. The system according to claim 1, wherein the predetermined layout is based upon a manufacturing drawing of the multi-robot system.

5. The system according to claim 1, wherein the software program establishes tracking frames in the simulation work cell through the robot simulation device.

6. The system according to claim 1, wherein the part tracking offset is calculated based on at least one of a frame calibration executed through the robot control system and a calibration path executed through the robot control system.

7. The system according to claim 6, wherein the frame calibration is a calculation of a work cell frame and the calibration path is a calculation of a taught path on a work piece.

8. The system according to claim 1, wherein the part tracking offset accounts for a work piece moving on a conveyor in the real robot work cell.

9. A method for calibrating a multi-robot system comprising the steps of:

creating a simulation work cell of an operation of a real robot work cell through a robot simulation device, the simulation work cell being based on a predetermined layout of the real robot work cell;

establishing tracking frames in the simulation work cell through the robot simulation device;

determining, through a robot control system for robots in the real robot work cell, if a deviation exists between the simulation work cell and the real robot work cell;

executing a frame calibration through the robot control system to calibrate the simulation work cell with the real robot work cell for controlling the robots; and teaching a nominal tracking frame for each of a plurality of robots of the multi-robot system including touching, by a tool of at least one robot of the plurality of robots, an identifiable point on a work piece at a first position of the work piece in the real robot work cell and touching, by the tool, the identifiable point on the work piece at a second position of the work piece in the real robot work cell.

10. The method according to claim 9, wherein the robot simulation device is offline from the robot control system.

11. The method according to claim 9, wherein the predetermined layout is based on a manufacturing drawing of the multi-robot system.

12. The method according to claim 9, wherein the frame calibration is executed if the deviation exists between the simulation work cell and real robot work cell and includes the steps of:
establishing a work cell frame in the real robot work cell; and
teaching the nominal tracking frame for each of the plurality of robots of the multi-robot system through the robot control system such that the nominal tracking frame for each of the plurality of robots is at the work cell frame.

13. The method according to claim 12, wherein teaching the nominal tracking frame includes jogging of the tool to a third position in a direction perpendicular to a travel direction of the work piece through the real robot work cell.

14. The method according to claim 12, wherein an offset is recorded through the robot control system during the teaching of the nominal tracking frame for each robot of the plurality of robots.

15. The method according to claim 9, wherein the calibration path includes teaching at least three non-linear points on the work piece.

16. The method of claim 9, further comprising the steps of:
relocating, through the robot simulation device, the simulation work cell to be substantially equivalent to the real robot work cell; and
calculating a part tracking offset through the robot simulation device based on the relocation of the simulation work cell.

17. The method according to claim 16, wherein a node map is displayed on the robot simulation device to assist a user in relocating the simulation work cell.

18. A method for calibrating a multi-robot system comprising the steps of:
creating a simulation work cell of an operation of a real robot work cell through a robot simulation device, the simulation work cell being based on a predetermined layout of the real robot work cell;
establishing tracking frames in the simulation work cell through the robot simulation device;
defining a work cell frame on the simulation work cell as being at a specified position of the work piece as the work piece travels on a conveyor, the specified position established when the work piece is initially detected before entering an operation zone, the specific positioned signaled to a controller to initiate control of the robots;
determining, through a robot control system for robots in the real robot work cell, if a deviation exists between the simulation work cell and the real robot work cell;
executing at least one of a frame calibration and a calibration path through the robot control system to calibrate the simulation work cell with the real robot work cell;
relocating, through the robot simulation device, the simulation work cell to be substantially equivalent to the real robot work cell; and
calculating a part tracking offset through the robot simulation device based on the relocation of the simulation work cell and using the part tracking offset to control the robots.

19. The method according to claim 18, wherein the frame calibration is executed if the deviation exists between the simulation work cell and real robot work cell and includes the step of:
teaching a nominal tracking frame for each of a plurality of robots of the multi-robot system through the real robot control system such that the nominal tracking frame for each of the plurality of robots is at the work cell frame.

* * * * *